United States Patent
Jansson

(10) Patent No.: US 6,612,776 B1
(45) Date of Patent: Sep. 2, 2003

(54) MANUFACTURE OF ARTICULATED, PREDOMINANTLY CONCRETE MAT

(76) Inventor: Jan Erik Jansson, 814 S. Sierra Ave., Solana Beach, CA (US) 92075-2616

( * ) Notice: Subject to any disclaimer, the term of this patent is extended or adjusted under 35 U.S.C. 154(b) by 0 days.

(21) Appl. No.: 10/286,677

(22) Filed: Nov. 1, 2002

(51) Int. Cl.[7] .............................. E02B 3/14; E01C 5/00
(52) U.S. Cl. ................. 405/20; 404/35; 52/98
(58) Field of Search ................ 404/34, 35; 405/15–20, 405/302.6, 302.7; 52/98

(56) References Cited

U.S. PATENT DOCUMENTS

| | | | | |
|---|---|---|---|---|
| 1,947,271 A | * | 2/1934 | Mattison | 427/272 |
| 3,008,256 A | * | 11/1961 | Rice | 156/63 |
| 3,891,340 A | * | 6/1975 | Bolli | 404/38 |
| 4,375,928 A | * | 3/1983 | Crow et al. | 405/20 |
| 5,108,222 A | | 4/1992 | Jansson et al. | |

\* cited by examiner

Primary Examiner—Heather Shackelford
Assistant Examiner—Sunil Singh
(74) Attorney, Agent, or Firm—Wood, Phillips, Katz, Clark & Mortimer

(57) ABSTRACT

In the manufacture of an articulated, predominantly concrete mat, which comprises concrete blocks and a flexible geogrid embedded in such blocks and in which the flexible geogrid defines flexible members connecting such blocks to one another, an intermediate article being a concrete slab is cast, in which a flexible geogrid is embedded. The slab has relatively thinner portions, along which the slab is breakable to form such blocks, and relatively thicker portions, which become such blocks when the slab is broken along the relatively thinner portions. Preferably, the relatively thinner portions extend longitudinally and transversely, in a rectangular array, before the slab is broken along the relatively thinner portions.

6 Claims, 3 Drawing Sheets

US 6,612,776 B1

MANUFACTURE OF ARTICULATED, PREDOMINANTLY CONCRETE MAT

TECHNICAL FIELD OF THE INVENTION

This invention pertains to the manufacture of an articulated, predominantly concrete mat, which comprises concrete blocks and a flexible geogrid embedded in said blocks and in which the flexible geogrid defines flexible members connecting said blocks to one another.

BACKGROUND OF THE INVENTION

An articulated, predominantly concrete mat is disclosed in U.S. Pat. No. 5,108,222, the disclosure of which is incorporated herein by reference. As disclosed therein, such a mat has numerous uses in retarding earth erosion due to wind, water, or both. Such a mat may be also used to line a driveway, a parking area, or an emergency roadway.

As disclosed in U.S. Pat. No. 5,108,222, supra, the articulated, predominantly concrete mat comprises concrete and a flexible geogrid, which is embedded in said blocks, and the flexible geogrid defines flexible members connecting said blocks to one another.

SUMMARY OF THE INVENTION

This invention facilitates the manufacture of an articulated, predominantly concrete mat, which comprises concrete blocks and a flexible geogrid embedded in said blocks and in which the flexible geogrid defines flexible members connecting said blocks to one another, by providing an intermediate article being a concrete slab, in which a flexible geogrid is embedded. When this invention is considered in terms of a process, the concrete slab is cast and the flexible geogrid is embedded when the concrete slab is cast.

The slab has relatively thinner portions, along which the slab is breakable to form said blocks. The slab has relatively thicker portions, which become said blocks when the slab is broken along the relatively thinner portions. Preferably, the relatively thinner portions extend longitudinally and transversely, before the slab is broken along the relatively thinner portions.

Depending upon the flexible geogrid that is used, the flexible members may be flexible straps, as disclosed in U.S. Pat. No. 5,108,222, supra, or flexible strands or strand bundles.

BRIEF DESCRIPTION OF THE DRAWINGS

FIG. 6 illustrates vegetation growing through some of the central apertures and growing between the discrete blocks.

DETAILED DESCRIPTION OF THE ILLUSTRATED EMBODIMENTS

Figure 1:
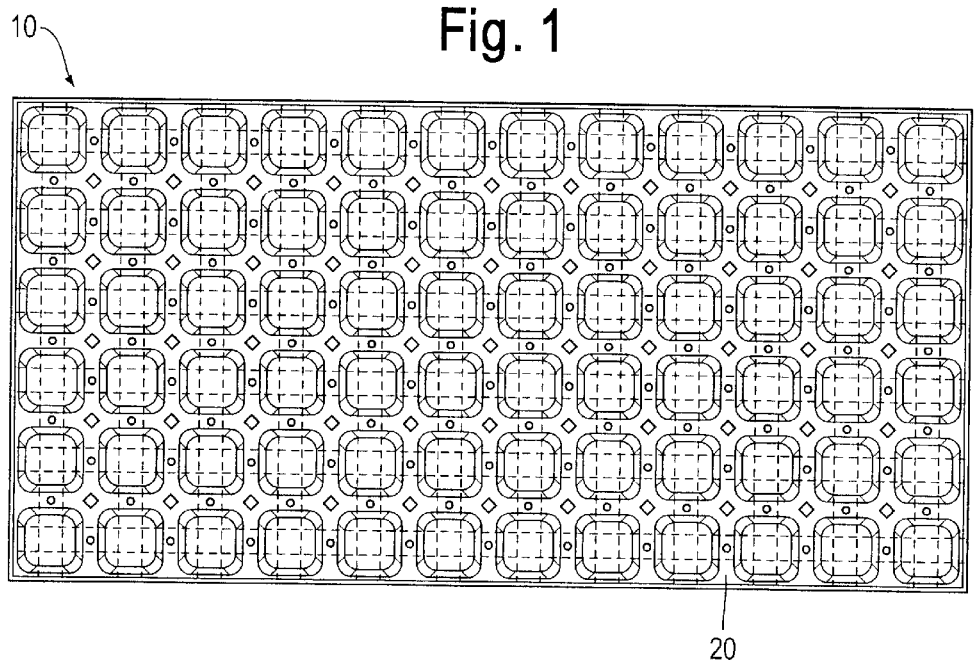
FIG. 1 is a plan view of a concrete slab, in which a flexible geogrid is embedded, whereby to provide an intermediate article embodying this invention.
Figure 2:
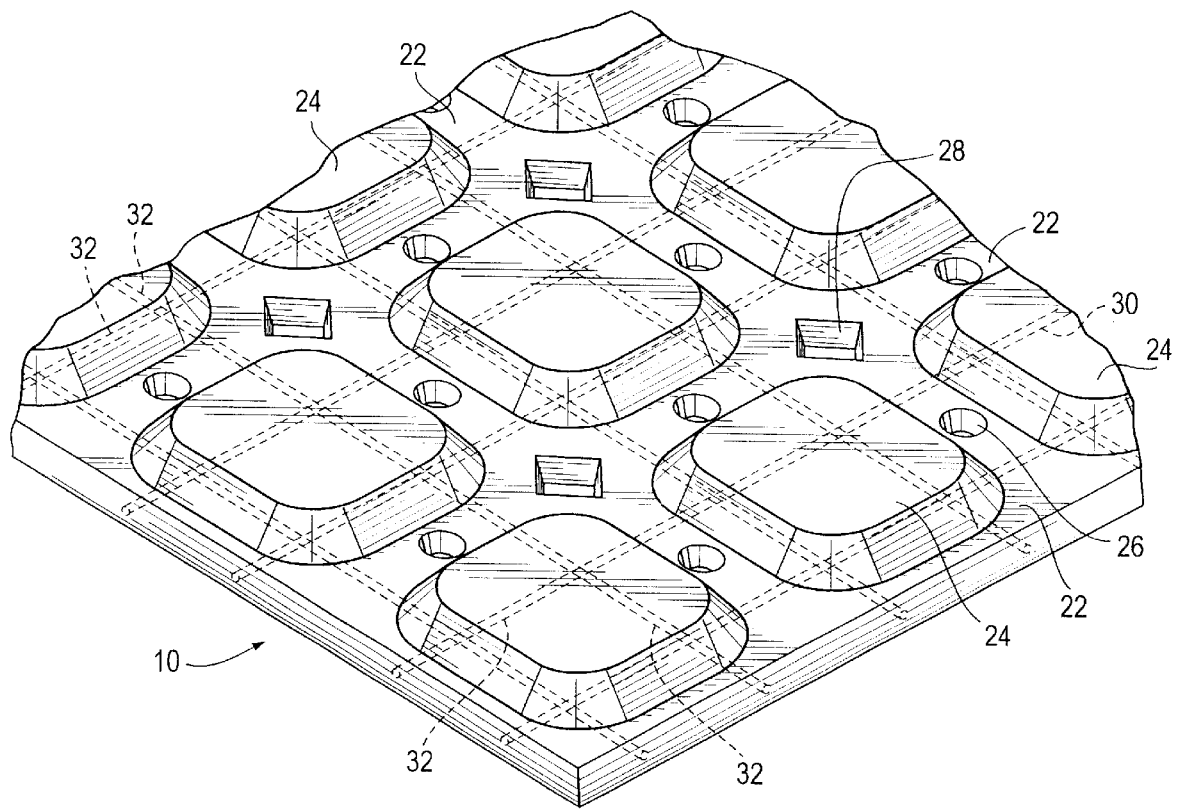
FIG. 2, on a larger scale, is a fragmentary, isometric view of an exemplary corner of the concrete slab, in which the flexible geogrid is embedded.
Figure 3:
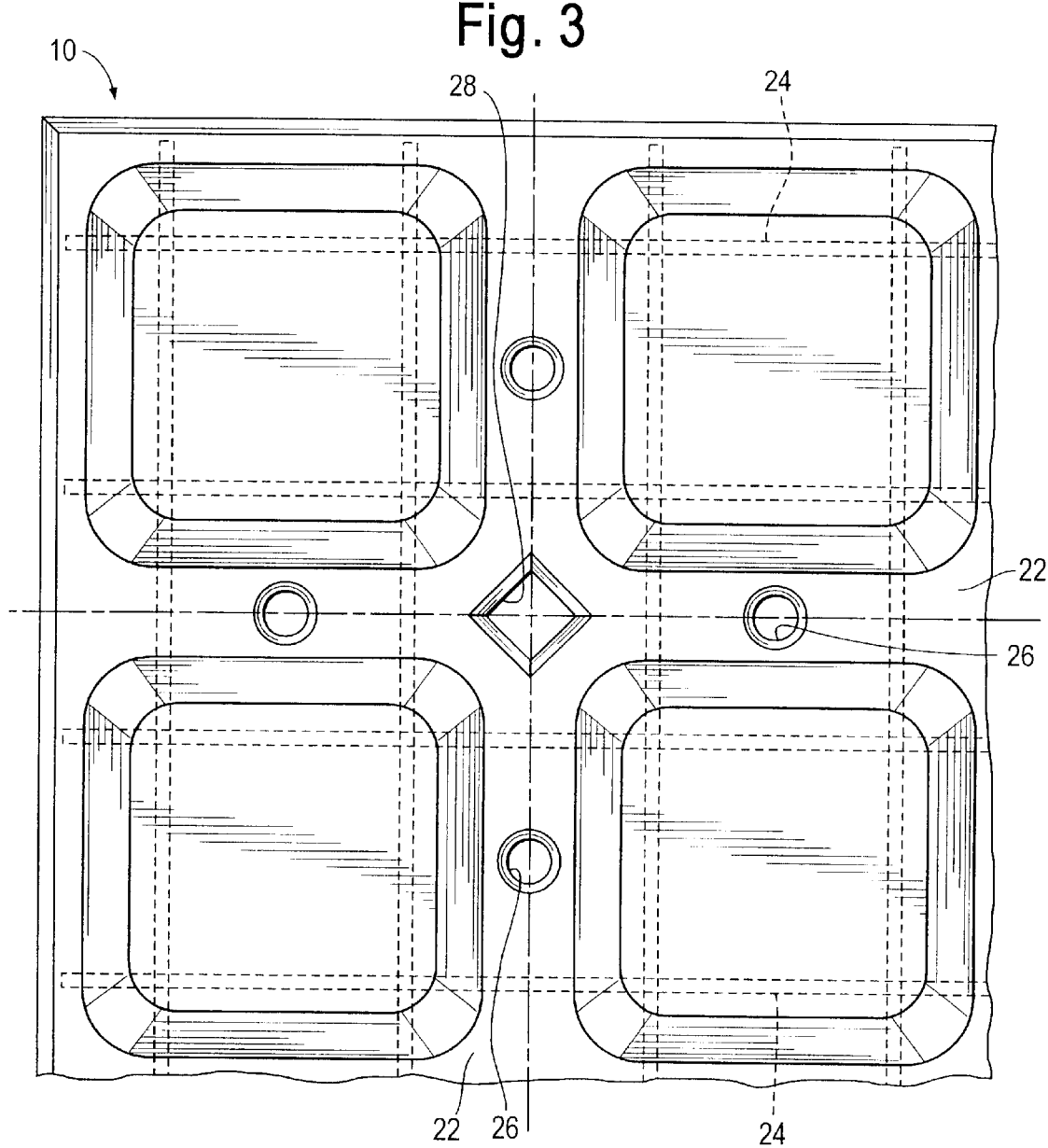
FIG. 3, on a similar scale, is a fragmentary, upper plan of a different corner of the concrete slab, in which the flexible geogrid is embedded.
Figure 4:
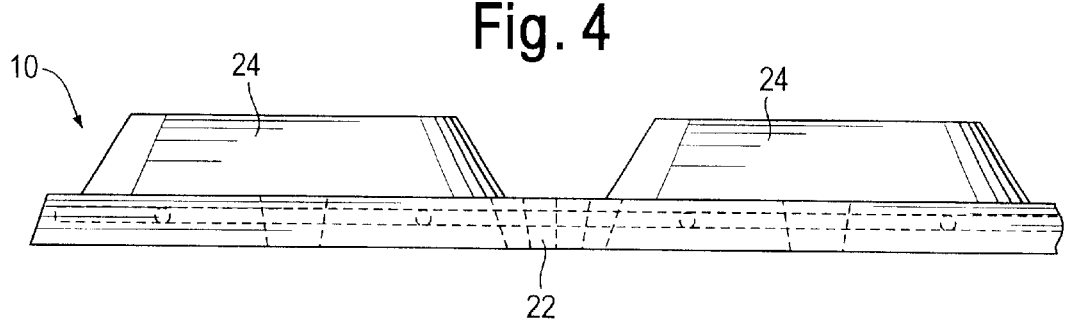
FIG. 4, on a similar scale, is an elevation of one edge of the concrete slab, in which the flexible geogrid is embedded.

In a preferred embodiment, which is illustrated in FIGS. 1 through 4, an intermediate article 10 in the manufacture of an articulated, predominantly concrete mat, which is similar to the articulated, predominantly concrete mat disclosed in U.S. Pat. No. 5,108,222, supra, comprises a rectangular, concrete slab 20 and a flexible geogrid 30, which is embedded in the concrete slab 20, so that flexible members 32 of the flexible geogrid 30 extend longitudinally and transversely, when the concrete slab 20 is cast.

The concrete slab 20 is cast, in an inverted orientation relative to its illustrated orientation, so as to have relatively thinner portions 22 extending longitudinally and transversely and so as to have relatively thicker portions 24, which are separated from one another by the relatively thinner portions 22.

Many flexible geogrids available commercially are suitable for the flexible geogrid 30. Depending upon the flexible geogrid 30 that is used, the flexible members 32 may be flexible straps, as disclosed in U.S. Pat. No. 5,108,222, supra, or flexible strands or strand bundles, as illustrated schematically herein.

Figure 5:
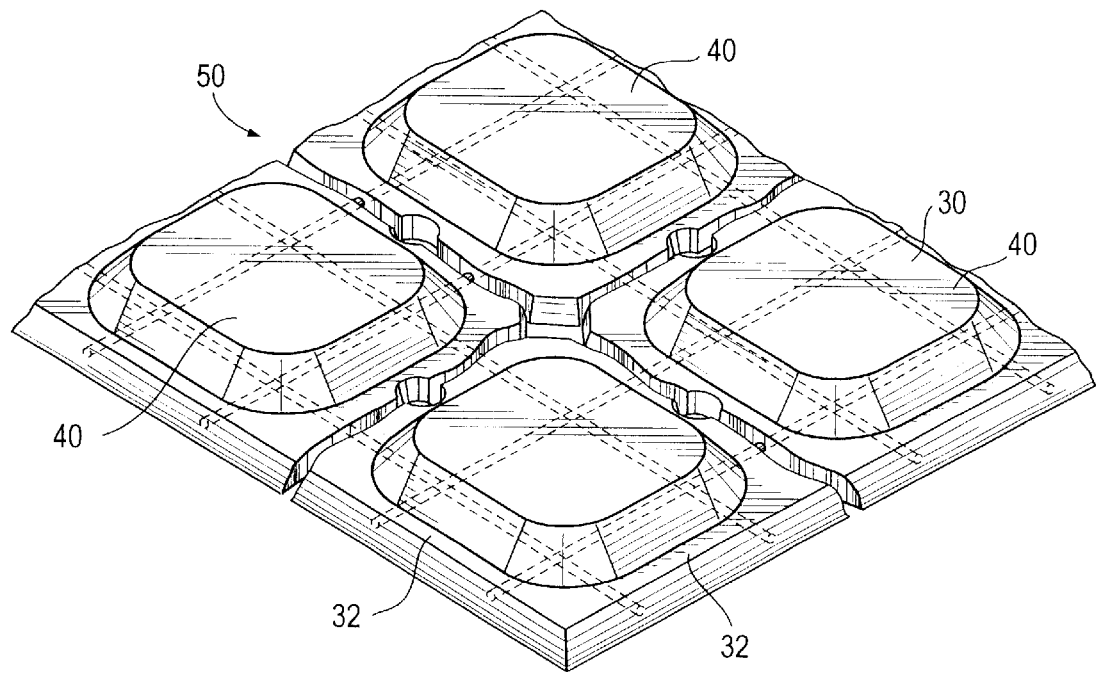
FIG. 5, on a similar scale, is a fragmentary, isometric view, which is similar to a portion of FIG. 2 but which is taken after the concrete slab has been broken along relatively thinner portions, whereby relatively thicker portions have become discrete, concrete blocks, which are connected to one another by flexible elements of the flexible geogrid, so as to provide an articulated, predominantly concrete mat.

As illustrated in FIG. 5, the concrete slab 20 is breakable along the relatively thinner portions 22, so that the relatively thicker portions 24 become discrete, concrete blocks 40 connected to one another by flexible members 32 of the flexible geogrid 30, which remains embedded in the respective blocks 40, whereby an articulated, predominantly concrete mat 50 is provided.

So as to facilitate breaking of the concrete slab 20 along the relatively. thinner portions 22, the concrete slab 20 has spaced holes, which include holes 26 having circular mouths and holes 28 having square mouths, along the relatively thinner portions 22. The relatively thinner portions 22 may be sufficiently thin to enable the concrete slab 20 to be thus broken by its own weight if and when the concrete slab 20 is lifted from its edges. Alternatively, the concrete slab 20 may be thus broken by a person wielding a suitable tool, such as an adze.

Figure 6:
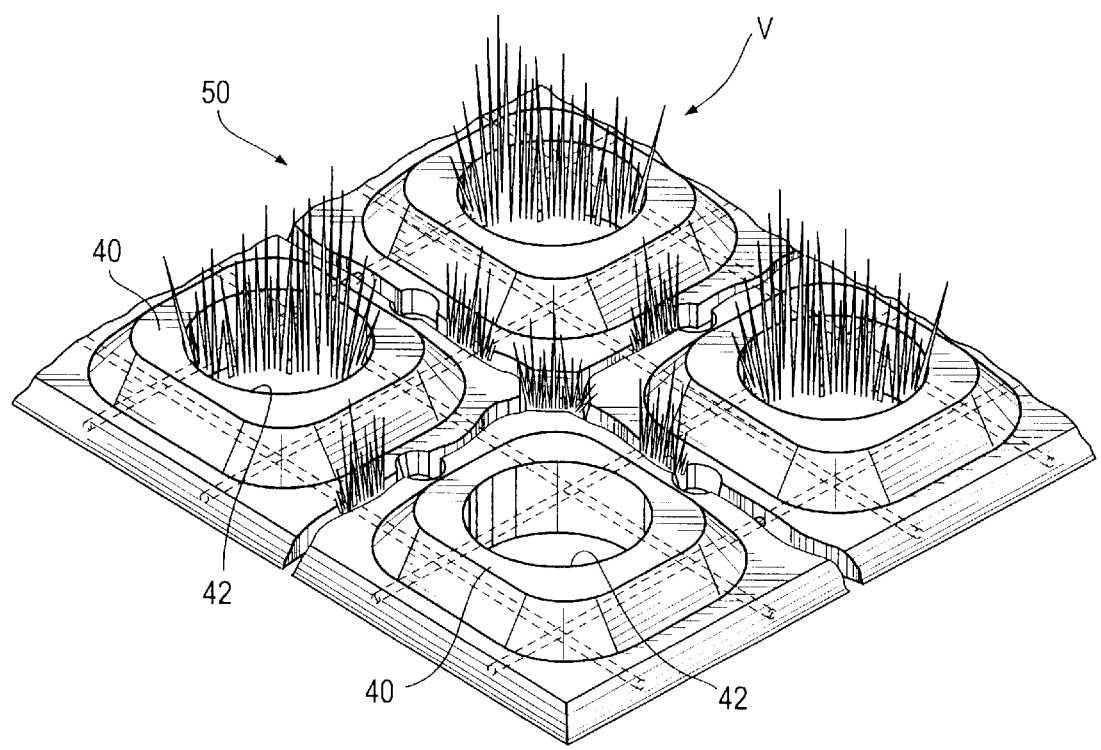
FIG. 6, on a similar scale, is a fragmentary, isometric view of an articulated, predominantly concrete, which is similar to the articulated, predominantly concrete mat illustrated in FIG. 5, except that each block in FIG. 6 has a central aperture, through which vegetation can grow.

In an alternative embodiment, which is illustrated in FIG. 6, each block 40 has a central aperture 42, which is similar to the central apertures of the blocks disclosed in U.S. Pat. No. 5,108,222, supra. As illustrated in FIG. 6, vegetation V also can grow through the central apertures 42 and between the respective blocks 40, whereby to stabilize the respective blocks 40 and partially to conceal the respective blocks 40. Even in the preferred embodiment, in which the blocks 40 do not have similar apertures, vegetation V can grow between the respective blocks 40.

As exemplary dimensions, all of which are approximate, the concrete slab 20 may have a width of twenty-four inches and a length of forty-eight inches, the relatively thinner portions 22 may have a thickness of three-eights inch, the relatively thicker portions 24 may have a thickness of one inch, the flexible geogrid 30 may have two inch square openings, which are defined by the flexible members 32, and the respective blocks 40 may be four inches square.

What is claimed is:

1. A concrete mat, comprising:

a concrete slab having relatively thick portions defining blocks connected by relatively thinner portions, said relatively thinner portions including holes therein spaced from said thick portions and defining weakened areas whereby said slab is breakable along portions of the thinner portions which are spaced from said thick portions defining blocks; and a flexible geogrid embedded is said slab, said geogrid defining flexible members connecting said blocks to one another when the slab is broken along the relatively thinner portions.

2. The concrete mat of claim 1, wherein said holes in said thinner portions define weakened areas generally centrally located between adjacent blocks.

3. The concrete mat of claim 1, wherein said holes are generally vertically oriented to define said weakened areas in a generally vertically orientation.

4. The concrete mat of claim 1, wherein at least some of said holes extend vertically through said relatively thinner portions and have square mouths.

5. An intermediate article in the manufacture of an articulated, predominantly concrete mat for an uneven surface, comprising:

a concrete slab having relatively thick portions defining blocks connected by relatively thinner portions, said relatively thinner portions including holes therein spaced from said thick portions and defining weakened areas whereby said slab is breakable along portions of the thinner portions which are spaced from said thick portions defining blocks; and a flexible geogrid embedded is said slab, said geogrid defining flexible members connecting said blocks to one another when the slab is broken along the relatively thinner portions.

6. A concrete mat, comprising the intermediate article of claim 5 disposed on an uneven ground surface with said relatively thinner portions broken along at least some of said defined weakened areas to follow the uneven ground surface, wherein grass grows through said broken weakened areas.

* * * * *

UNITED STATES PATENT AND TRADEMARK OFFICE
CERTIFICATE OF CORRECTION

PATENT NO. : 6,612,776 B1  Page 1 of 1
APPLICATION NO. : 10/286677
DATED : September 2, 2003
INVENTOR(S) : Jan Erik Jansson It is certified that error appears in the above-identified patent and that said Letters Patent is hereby corrected as shown below:

Column 3, line 10, "is" should read --in--.

Column 4, line 11, "is" should read --in--.

Signed and Sealed this

Twenty-ninth Day of September, 2009

David J. Kappos
*Director of the United States Patent and Trademark Office*